United States Patent [19]

Favareto

[11] 4,312,622
[45] Jan. 26, 1982

[54] MANIPULATOR

[75] Inventor: Marcello Favareto, Turin, Italy

[73] Assignee: Comau S.p.A., Turin, Italy

[21] Appl. No.: 12,109

[22] Filed: Feb. 14, 1979

[30] Foreign Application Priority Data

Feb. 17, 1978 [IT] Italy ............................... 67325 A/78

[51] Int. Cl.³ ............................................... B25J 9/00
[52] U.S. Cl. .................................... 414/730; 414/735;
414/753; 414/7
[58] Field of Search ................... 414/728, 730, 744 A,
414/753, 735, 4, 7

[56] References Cited

U.S. PATENT DOCUMENTS 2,959,301  11/1960  Willsea ................................ 414/730
3,507,403  4/1970   Moore et al. ..................... 414/728 X
3,661,051  5/1972   Dunne et al. ..................... 414/730 X Primary Examiner—Galen L. Barefoot
Assistant Examiner—Terrance L. Siemens
Attorney, Agent, or Firm—Michael J. Striker

[57] ABSTRACT

The electrical spot welding manipulator is assembled of a base, a rotary support on the base, an arm hinged to the support and rotatable at right angles to the support, a rotatable hollow member inside the arm, a column arranged inside the hollow arm for rotation about its axis, a working head mounted on the column and being rotatable about two secondary axes, movable welding grips mounted on the head, actuator elements, for activating respective movable members, and a welding transformer arranged in the arm and connected to the welding grips by flexible conductors.

9 Claims, 8 Drawing Figures

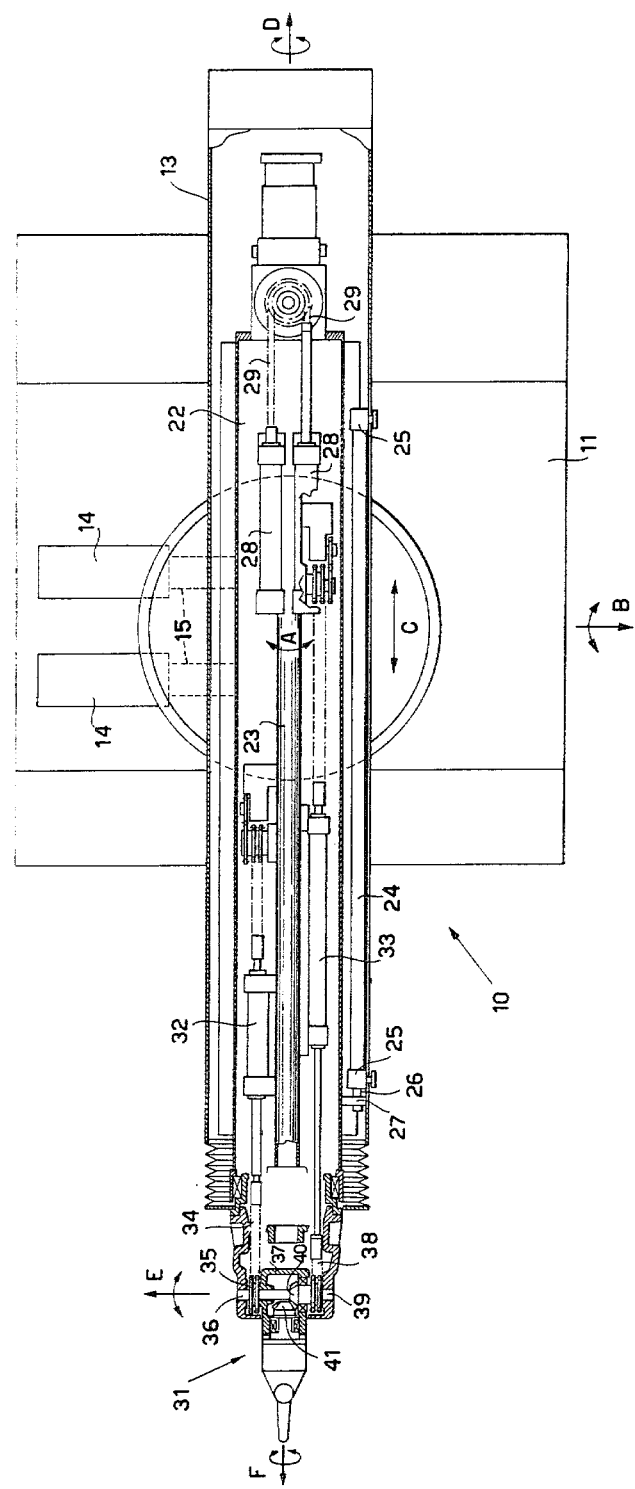

MANIPULATOR

BACKGROUND OF THE INVENTION

This invention relates to a type of manipulator which can move with six degrees of freedom, and is provided with completely automatic programmable control.

This manipulator is able to carry out any operation for which such manipulators are usually used, such as picking up and conveying pieces from one location to another working location, or welding on to any type of structure, or more varied applications according to requirements.

The manipulator proposed by the invention has been designed to be of particular use and advantage in application to spot welding.

SUMMARY OF THE INVENTION

To this end, besides possessing favourable operating characteristics such as an effective loading capacity, speed, acceleration, accuracy and mechanical strength, this manipulator can be formed into various structural configurations such as to make it particularly versatile in assuming the various forms required by its use.

In this respect, its structure is formed in such a manner that the manipulator welding grip can be connected by flexible cables to a transformer external to the manipulator, or alternatively the transformer can be incorporated into the manipulator itself, with obvious utilisation and size advantages.

These two versions are also available where the manipulator is suspended instead of being fixed to the ground, i.e. is mounted vertically and consequently possibly mobile along a processing line.

All these versions are made possible by the special configuration of the manipulator, and the same operating characteristics, including the possibility of moving the chuck in the surrounding space, are common to all versions.

The control system for this manipulator is entirely hydraulic and therefore extremely reliable. In addition, because of the use of hydraulic actuators, the various rotary or translatory movements of the members of which it is composed are effected in the most direct manner possible, without the use of numerous mechanical transmissions, thus ensuring a high structural rigidity, a minimum amount of slack, and the minimum number of mechanical members susceptible to wear.

These and further objects, which will be more apparent hereinafter, are attained according to the present invention by a manipulator with a working head operating through a sequence of movements of several degrees of freedom, comprising a base, a support carried by said base and rotating about one of its axes which is orthogonal to said base, an arm hinged to said support and rotating about an axis orthogonal to the axis of rotation of the support, a hollow member inside the arm and translatable longitudinally in such a manner that it can be extended and retracted along a direction orthogonal to the axis of rotation both of the support and of the arm, a column inside said hollow member which translates rigidly therewith and rotates about an axis parallel to the axis of translation, a working head carried by the column and rotating about secondary axes, the first of which lies in a plane orthogonal to the directions of translation of the column and the second lies in a plane orthogonal to said first axis, there being provided actuator means for effecting the rotary and translatory movements of said members, and control apparatus for sequentially controlling said actuators A description is given hereinafter by way of non-limiting example of a preferred embodiment of the manipulator according to the invention, with reference to the accompanying drawings in which:

BRIEF DESCRIPTION OF THE DRAWING

FIGS. 3 and 4 are views corresponding to those of FIGS. 1 and 2, but each being sectioned on horizontal and vertical planes respectively, to allow a view of the internal members;

FIGS. 5 and 6 are elevation and plan views respectively of a preferred embodiment of the working head of the manipulator, where this latter is used for welding.

DESCRIPTION OF THE PREFERRED EMBODIMENTS

The manipulator according to the invention is indicated overall by 10. It comprises a fixed base 11 designed to enclose the receiver of a compressed fluid unit, which represents the buffer of the control system for the mobile members of the manipulator (this system not being described as it is of known type). In addition to the compressed fluid unit, the base 11 constitutes the support for the member which rotates a support 12 (FIGS. 1 and 3) about a vertical axis A, this support lying above the base 11 and having the arm 13 of the manipulator pivoted to it, as described hereinafter.

Figure 3:
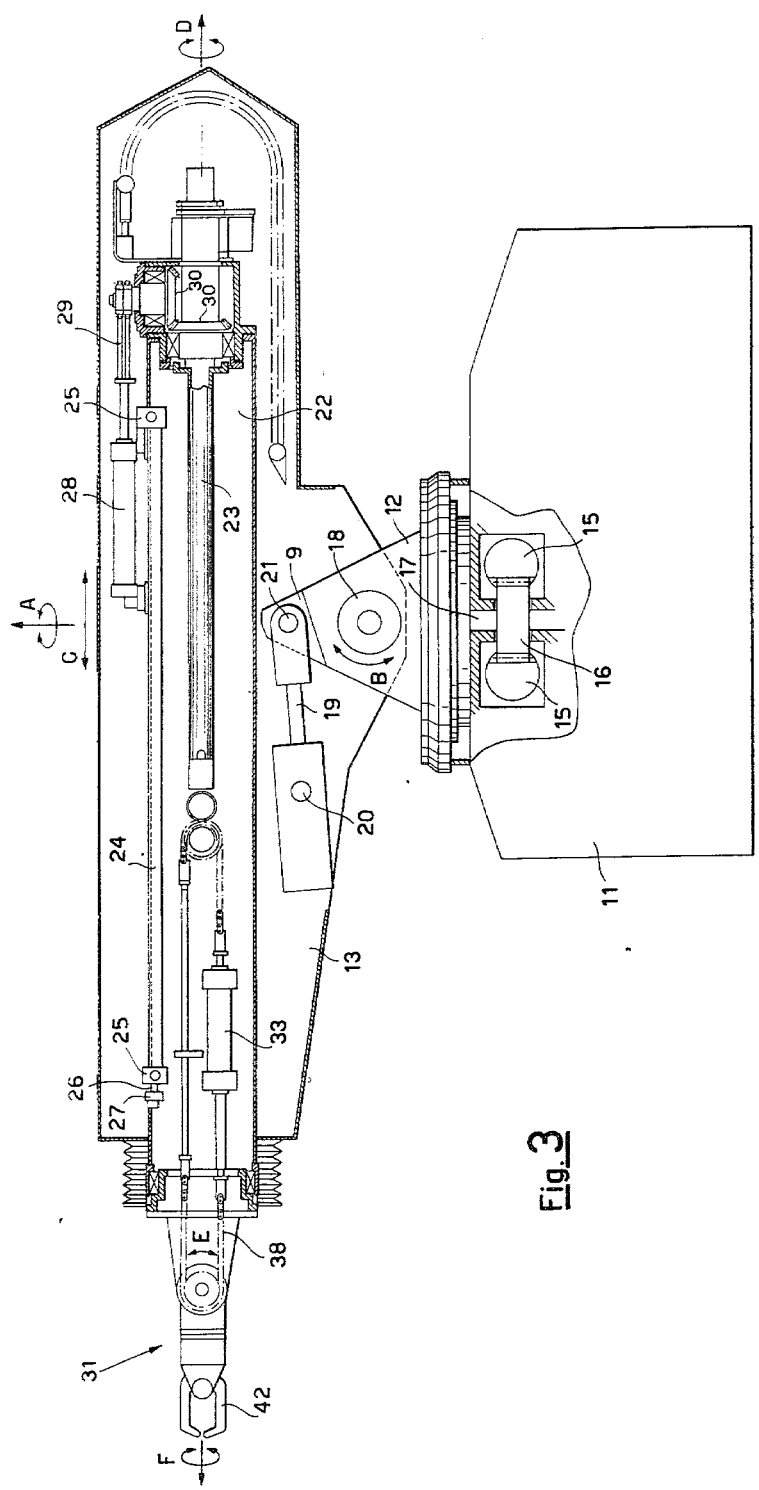

The member which rotates the support 12 is constituted by a pair of single acting cylinders 14 (FIG. 4), having rods 15 which are partially toothed and engaging with a pinion 16 keyed on to a pivot 17 on the support 12 (FIG. 3). The arm 13 is pivoted at 18 to the support 12, and its rotary movement about an axis B orthogonal to the axis A is obtained by a double acting cylinder 19 hinged to the arm at 20 and having its rod pivoted at 21 to a fork 9 on the support 12.

With reference to FIGS. 3 and 4, the arm 13 is constituted by a hollow light alloy casting containing internally a hollow tube 22 which can translate along a direction C, and carries internally a column 23 which rotates about its axis D and translates rigidly with the outer tube 22.

The translatory movement of the tube 22 is provided by a double acting cylinder 24, the casing of which is connected at 25 directly to the inside of the arm 13, and its rod 26 is rigidly connected to the tube 22 at 27.

The inner column 23 is rotated by a pair of double acting cylinders 28 fixed to the outer tube 22, and which transmit the rotary motion by chains 29 which operate a bevel gear pair 30.

The arm 14 is open at one of its ends to receive the working head 31. This latter possesses a further two degrees of rotational freedom, one about an axis E orthogonal to the axis D of the column 23, and one about an axis F orthogonal to the axis E.

These movements are provided by two cylinders 32 and 33 fixed to the inner column 23. The first of the two cylinders 32 operates a chain 34 which engages around a sprocket 35 keyed on to the pivot 36, with which the shell 37 of the head 31 is rigid, to cause it to rotate about said axis E passing through the pivot 36.

The second cylinder 33 also operates a chain 38 which engages with a sprocket 39 with which a bevel gear 40 is rigid. A second bevel gear 41, which engages with the former, directly rotates the head 31 within the shell 37 and about its axis F.

At the end of the head 31 there is a working member 42, which can be of different types according to requirements.

In FIGS. 1 to 4, the member 42 is illustrated as a common grip for simplicity. In FIG. 5 however, the member 42' is illustrated as a welding grip, and for this purpose is provided with suitable flexible cables 43 which connect the grip to the transformer.

A manipulating machine is therefore formed which is able to move its end fitting 42 or 42' of the working head 31 with six degrees of freedom in an automatic programmable manner.

Figure 1:
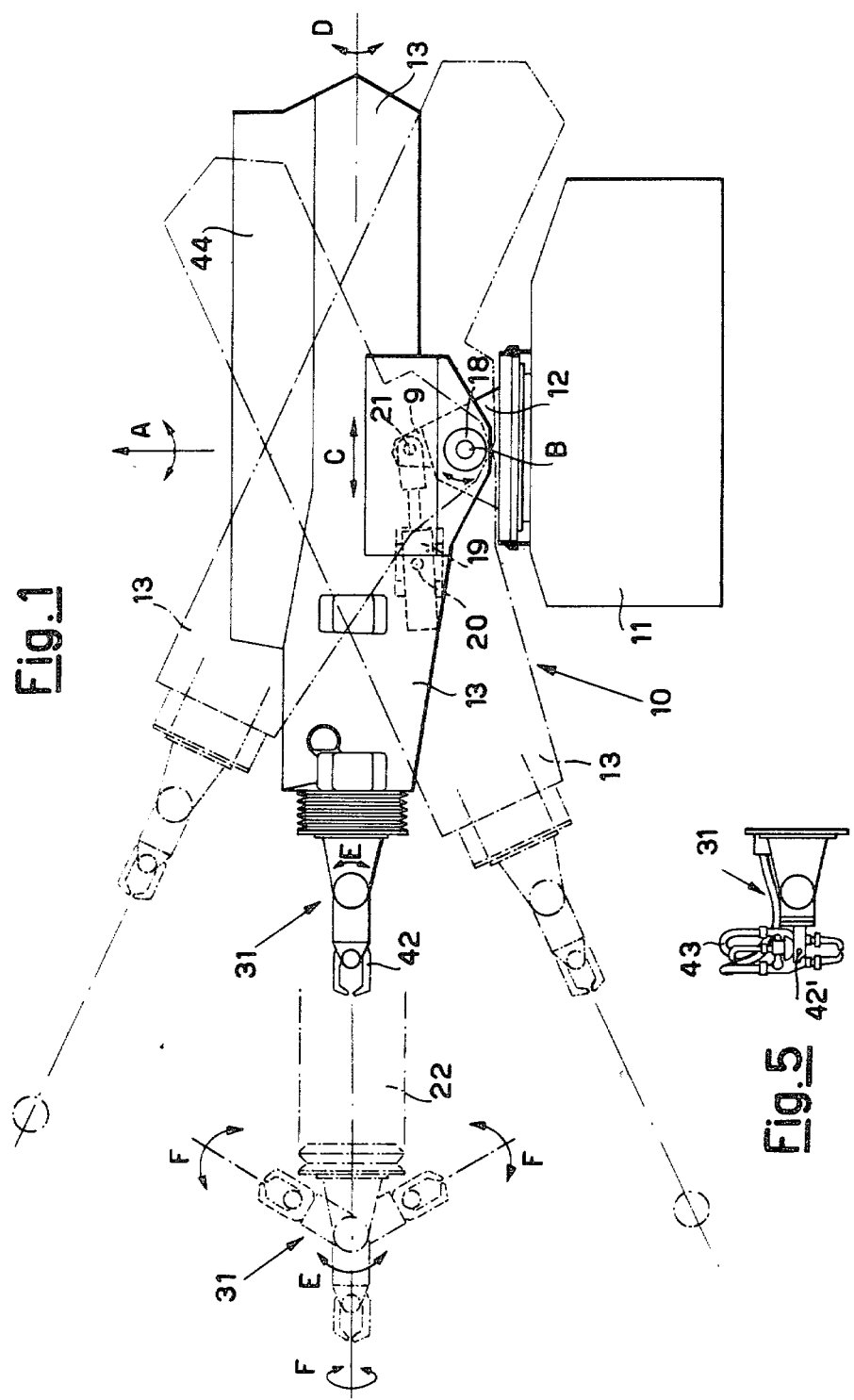
FIGS. 1 and 2 are an elevation and plan view respectively of a preferred embodiment of the manipulator according to the invention, both figures showing by means of dashed and dotted lines some of the possible angular and longitudinal movements of the component members of the manipulator.
Figure 2:
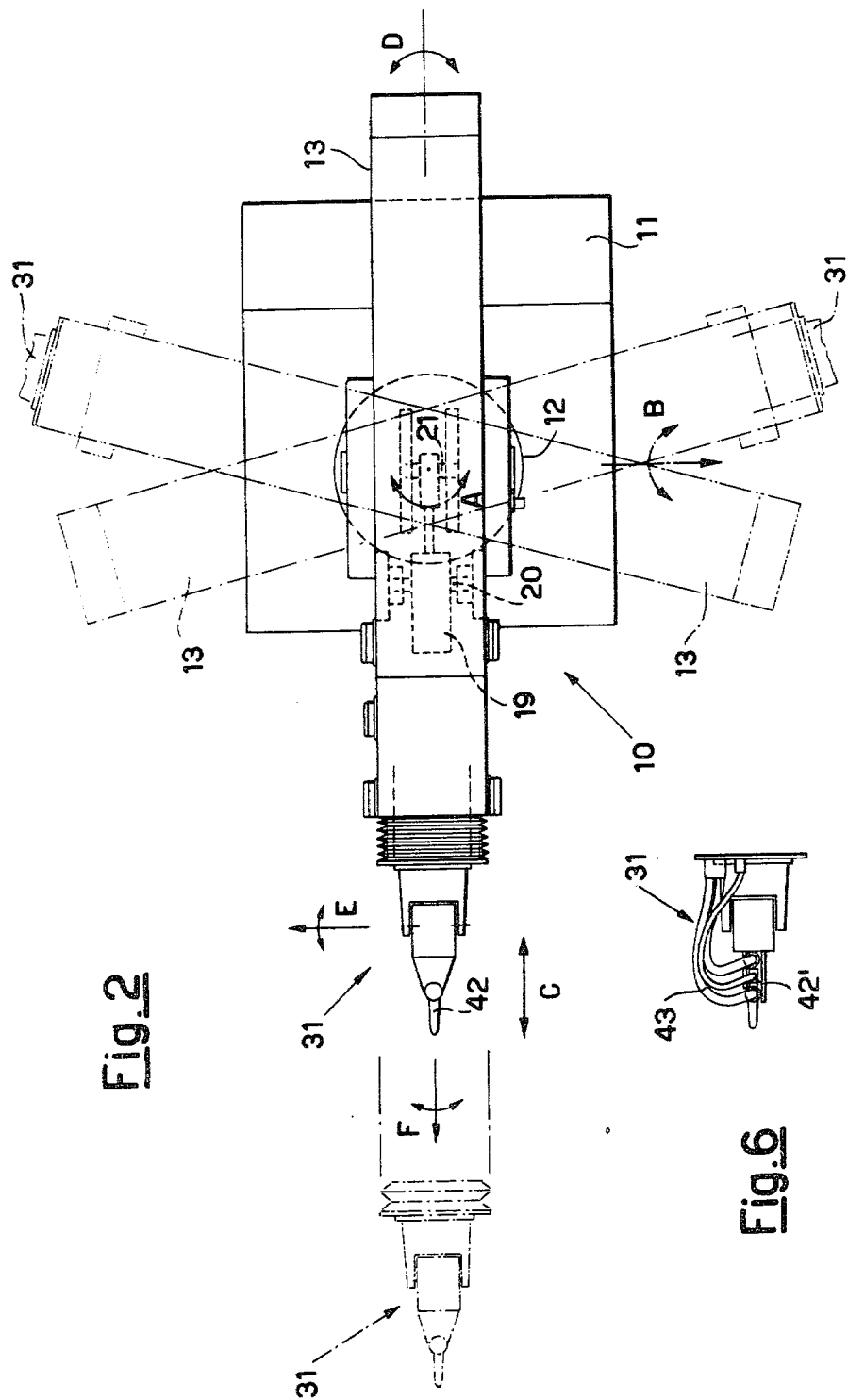

Summarising, the machine according to the invention carries out the following movements: rotation of the support 12 and consequently the arm 13 about the vertical axis A (see the dashed and dotted lines in FIG. 2 which diagrammatically illustrate the two rotations in one direction and the other); rotation of the arm 13 in a vertical plane about the axis B (see the dashed and dotted lines in FIG. 1, which diagrammatically illustrate the two rotations and the upward and downward translation); translation of the tube 22 in the direction C, inside and outside the arm 13 (also illustrated diagrammatically in FIG. 1 by dashed and dotted lines); rotation of the column 23 in the tube 22, about its axis D; rotation of the working head 31 about an axis E lying in a plane orthogonal to the axis D (illustrated diagrammatically in FIG. 1 by dashed and dotted lines), for any rotation of the column 23, and about its axis F lying in a plane orthogonal to the axis E. With regard to this latter rotation of the end 12 of the head 31, FIG. 1 shows that this can take place for any position of the chuck 42, whether rotated or not about the axis E, by virtue of the differential control obtained by the two rotations provided by the two cylinders 32 and 33.

The machine is also provided with a cabinet located separately, which is not described as it is of known type, and which comprises the electrical and electronic control and programming device for the aforesaid movements of the manipulator according to the invention.

Figure 7:
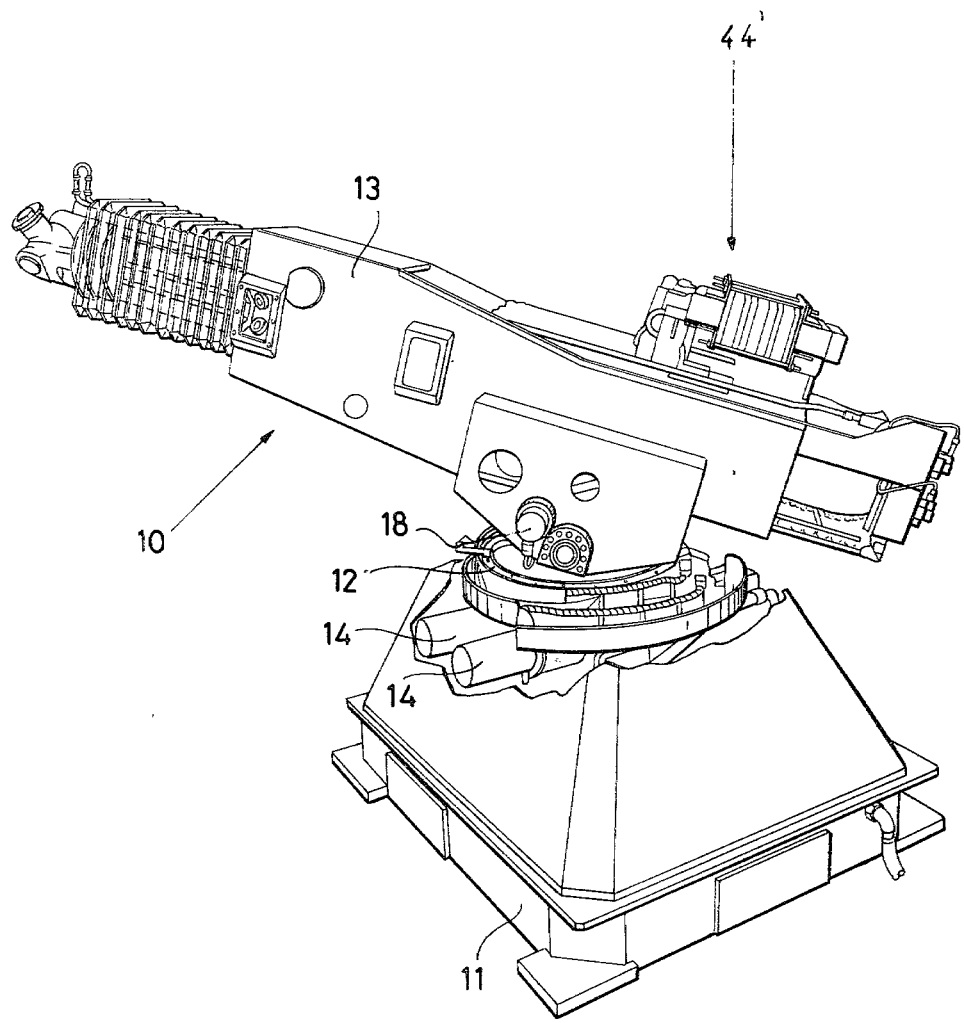
FIG. 7 is a perspective view of the electrical spot welding manipulator.

The description of the manipulator given heretofore refers to the most usual case, i.e. when resting on the ground and using either clamping grips 42 or welding grips 42'. In this second case, as illustrated in FIG. 7, the transformer 44' can be positioned either outside the machine or inside it, and advantageously in the arm 13 by providing a compartment above the arm, such as that illustrated by 44 in FIG. 1, to provide very little extra bulk in a position which is in no way damaging.

Figure 8:
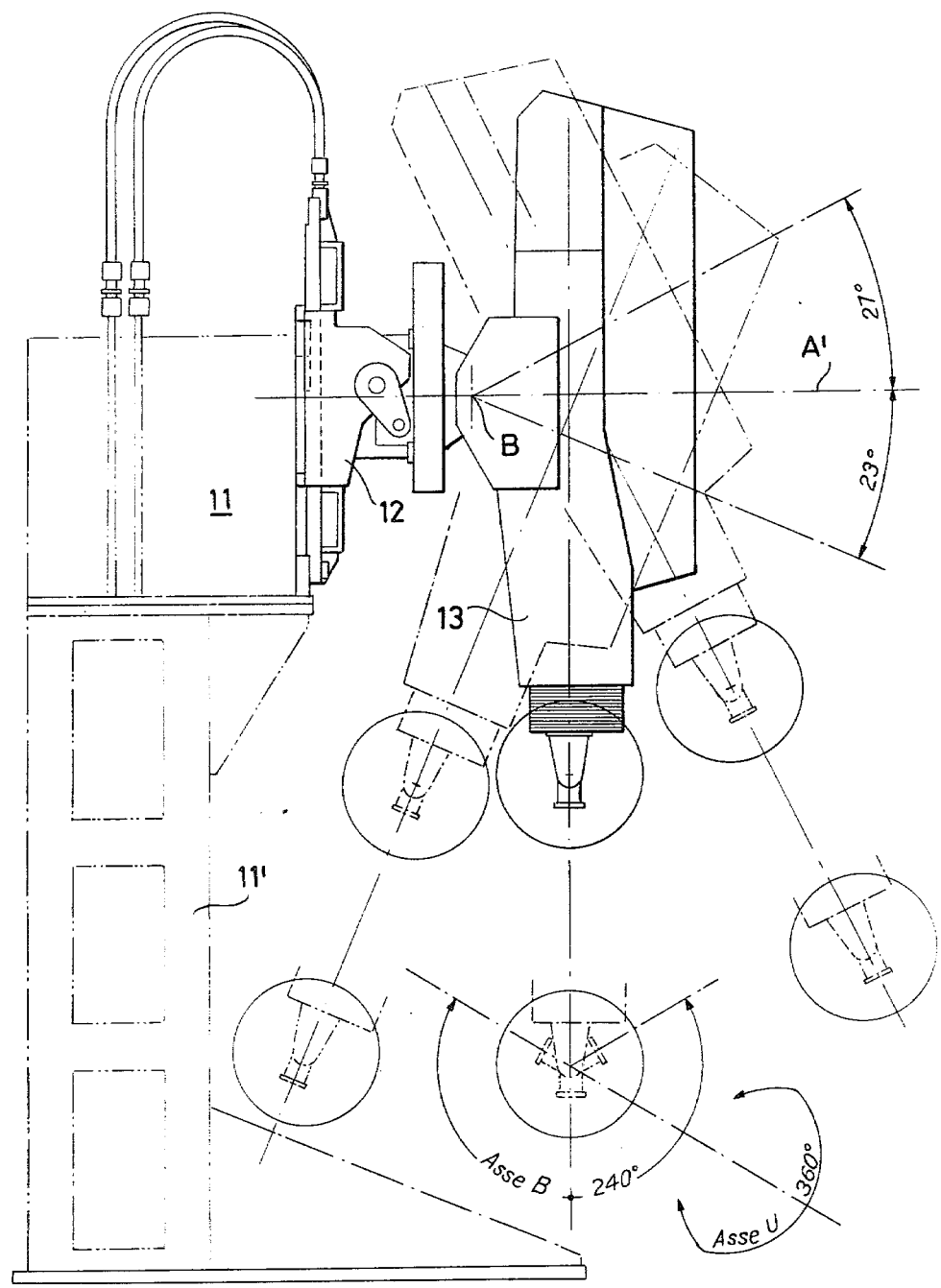
FIG. 8 is an elevation view of another embodiment of the manipulator according to the invention.

Finally, the only difference between the suspended configuration of the machine depicted in FIG. 8 and that heretofore described is that its base assembly 11 and 11' for supporting the manipulator and containing the compressed fluid unit is vertical and separate from the rest of the machine so as to not load with excessive weight the supports which support the manipulator above the ground.

Some embodiments of the proposed manipulator for rotation about horizontal axes A' and B have been described and illustrated, all of which provide the same advantages and are of equal use. However, further structural and operational modifications can be made thereto without leaving the scope of the invention, as proposed by the following claims.

What we claim is:

1. A manipulator with a working head operating through a sequence of movements of several degrees of freedom, comprising an upright base, a support carried by said base and rotating about one of its axes which is orthogonal to said base, an arm hinged to said support and rotating about a horizontal axis orthogonal to the axis of rotation of the support, a hollow member inside the arm and translatable longitudinally in such a manner that it can be extended and retracted along a direction orthogonal to the axis of rotation both of the support and of the arm, a column inside said hollow member which translates rigidly therewith and rotates about an axis parallel to the axis of translation, and a working head carried by the column and rotating about secondary axes, the first of which lies in a plane orthogonal to the direction of translation of the column and the second lies in a plane orthogonal to said first axis, actuator means for effecting the rotary and translatory movements of said members, and control apparatus arranged in said base for sequentially controlling said actuator means.

2. A manipulator as claimed in claim 1, which is suspended, with the axis of rotation of the support horizontal.

3. An electrical spot welding manipulator with a working head operating through a sequence of movements of several degrees of freedom, comprising a base, a support carried by said base and rotating about one of its axes which is orthogonal to said base, an arm hinged to said support and rotating about an axis orthogonal to the axis of rotation of the support, a hollow member inside the arm and translatable longitudinally in such a manner that it can be extended and retracted along a direction orthogonal to the axis of rotation both of the support and of the arm, a column inside said hollow member which translates rigidly therewith and rotates about an axis parallel to the axis of translation, and a working head carried by the column and rotating about secondary axes, the first of which lies in a plane orthogonal to the direction of translation of the column and the second lies in a plane orthogonal to said first axis, movable welding grips mounted on said head; actuator means for effecting the rotary and translatory movements of respective movable members, control apparatus for sequentially controlling said actuator means, and a welding transformer arranged in said arm and connected to the welding grips by flexible conductors.

4. A manipulator as claimed in claim 3, which is fixed with its base resting on the ground and the axis of rotation of the support vertical.

5. A manipulator as claimed in claim 3, wherein the means for rotating the arm support are constituted by at least one hydraulic cylinder carried by the base, its partially toothed rod engaging with a pinion on the support.

6. A manipulator as claimed in claim 3, wherein the means for rotating the arm are constituted by at least one hydraulic cylinder, its casing and rod being hinged to the arm and to the support.

7. A manipulator as claimed in claim 3, wherein the means for causing the hollow member to translate inside the arm are constituted by at least one hydraulic cylinder positioned with its axis parallel to the axis of translation, its casing being rigid with the inner face of the arm, and its rod being rigid with the hollow member.

8. A manipulator as claimed in claim 3, wherein the means for rotating the column inside the hollow member are constituted by a pair of hydraulic cylinders in the member, their rods each carrying the end of a chain or belt which engages with a sprocket, the column and sprocket being rotatably connected by a bevel gear pair.

9. A manipulator as claimed in claim 3, wherein the means for rotating the working head about secondary axes are constituted by two hydraulic cylinders rigid with the column, each operating a chain or belt which engages with a sprocket, the first of which is keyed on to a rotating pivot rigid with the casing of the head, and the second rotating the head about an axis orthogonal to the first, by way of a bevel gear pair.

* * * * *